United States Patent [19]

Glabe et al.

[11] 4,178,370

[45] * Dec. 11, 1979

[54] FEEDING PIGS

[75] Inventors: Elmer F. Glabe, Northbrook, Ill.; Herbert J. Rebhan, New Richmond, Wis.

[73] Assignee: Food Technology Products, Chicago, Ill.

[*] Notice: The portion of the term of this patent subsequent to Dec. 11, 1996, has been disclaimed.

[21] Appl. No.: 897,112

[22] Filed: Apr. 17, 1978

Related U.S. Application Data

[63] Continuation-in-part of Ser. No. 817,001, Jul. 18, 1977, abandoned.

[51] Int. Cl.² .................................................. A23K 1/00
[52] U.S. Cl. .................................. 424/177; 424/317; 426/2; 426/807
[58] Field of Search .................... 426/2, 335, 532, 583, 426/807, 630, 635, 53, 54; 424/177, 311, 317, 180

[56] References Cited

U.S. PATENT DOCUMENTS

| | | | |
|---|---|---|---|
| 3,925,559 | 12/1975 | Glabe et al. | 426/807 |
| 4,015,018 | 3/1977 | Glabe et al. | 426/2 |
| 4,016,294 | 4/1977 | Glabe et al. | 426/331 X |

OTHER PUBLICATIONS

Morrison "Feeds & Feeding", Morrison Publishing Co., 1956, pp. 517, 518, 1068, 1124–1125 & 1127.

*Primary Examiner*—R. B. Penland
*Attorney, Agent, or Firm*—Richard L. Johnston

[57] ABSTRACT

Mixed feeds used in feeding pigs are improved by adding sodium diacetate and dehydrated whey in proportions sufficient to enhance feed efficiency.

5 Claims, No Drawings

FEEDING PIGS

RELATED CASES

This application is a continuation-in-part of U.S. Pat. application Ser. No. 817,001 filed July 18, 1977, now abandoned.

BACKGROUND

In U.S. Pat. No. 4,015,018 issued Mar. 29, 1977, there is described a composition consisting essentially of sodium diacetate and dehydrated whey which is used to enhance the production of silage. This composition is a combination of edible nontoxic substances which aid in the fermentation of silage at an earlier stage in the fermentation process and inhibit the formation of undesirable butyric acid.

OBJECTS

One of the objects of the present invention is to provide new and useful mixed feeds for pigs.

Another object is to provide a new and improved process of improving feed efficiency in the raising of pigs. Other objects will appear hereinafter.

BRIEF SUMMARY OF THE INVENTION

In accordance with the invention mixed feeds used in feeding pigs are improved by adding sodium diacetate and dehydrated whey in proportions sufficient to enhance feed efficiency.

DETAILED DESCRIPTION OF THE INVENTION

Sodium diacetate is non-toxic to man or animals since it metabolizes directly to carbon dioxide and water, leaving no residue in the tissues. It is not corrosive to equipment and may be safely handled by human beings using ordinary precautions.

Dehydrated whey is obtained by drying liquid whey which is a principal by-product of the cheese industry and is obtained after the removal of casein and fat from milk which is processed in making cheese. The residual liquid which contains protein, lactose and lactoalbumen as well as minor amounts of fat and minerals usually contains over 90% water which is largely removed by spray drying or some other form of dehydration to produce the dehydrated whey solids that are employed in the practice of the present invention. A typical analysis of dehydrated whey is as follows:

| | |
|---|---|
| Moisture | 4.5% |
| Protein* | 12.9% |
| Fat | 1.1% |
| Total Carbohydrate** | 73.5% |
| Ash (calcium, phosphorus, iron) | 8.0% |

*50% lactoalbumen
**the carbohydrate is virtually all lactose, only a fraction of a percent is dextrose.

A typical additive for use in preparing pig feeds in accordance with the invention has the following composition:

TABLE I

| Ingredients | Per Cent by Weight |
|---|---|
| Sodium diacetate | 50% |
| Spray-dried whey | 35.3% |
| Calcium carbonate | 8.2% |
| Bentonite (a silicate compound) | 5.0% |
| Mineral or Coconut Oil | 1.0% |
| Zeolex (sodium aluminosilicate anti-caking agent) | .50% |
| | 100.00% |

Of the above ingredients, sodium diacetate and whey are the only effective components for the purpose of the invention. Calcium carbonate and bentonite are anti-humectants for sodium diacetate and whey. They act as free-flowing agents permitting easy distribution. The coconut oil or mineral oil is an anti-dusting factor. Other anti-humectants and other anti-dusting factors which are edible inert substances as well as non-toxic can be employed. These substances generally have no substantial effect on the feed efficiency of the pig feed. In general, the sodium diacetate will comprise 20-75% by weight of the additive composition and the weight ratio of sodium diacetate to dehydrated whey will be within the range of 25:1 to 1:4. The amount of dehydrated whey is preferably at least 3% by weight of the composition and the amount of inert ingredients preferably does not exceed 47% by weight of the composition.

In order to evaluate the invention tests were carried out with pigs using standard pig feeds with and without the addition of a sodium diacetate-dehydrated whey composition as typified by the compositions set forth in Table I.

100 newly weaned pigs were ear-tagged and divided into pens of 20 pigs each. Each of these five pens contained pigs of approximately the same starting weight.

A mixed feed was prepared consisting of 400 pounds Ham Maker and 1600 pounds ground corn. Ham Maker is a standard feed comprising mainly meat and bone meal, soybean meal, wheat middlings and meat meal tankage with smaller amounts of other ingredients. Usually, it contains at least 40% protein.

The pigs in pen 1 were fed the basic feed without any additives. The pigs in pen 2 were fed the basic feed plus 2 pounds per ton of the sodium diacetate-whey composition described in Table I. The pigs in pen 3 were fed the basic feed plus 4 pounds per ton of the sodium diacetate-whey composition described in Table I. The pigs in pen 4 were fed the basic feed plus 8 pounds per ton of the sodium diacetate-whey composition described in Table I. The pigs in pen 5 were fed the basic feed plus a standard antibiotic (ASP 250). This standard antibiotic contains one part aureomycine (chlortetracycline), one part sulfamethazine and 0.5 part penicillin.

Each pig in each pen was weighed at the start and at an intermediate period during the test and again on the final day of the test. In pen 1 the intermediate period was the 60th day and the final period was the 93rd day. In pen 2 the intermediate period was the 63rd day and the final period was the 98th day. In pen 3 the intermediate period was the 63rd day and the final period was the 93rd day. In pen 4 the intermediate period was the 56th day and the final period the 88th day. In pen 5 the intermediate period was the 56th day and the final period the 87th day. All together there were three time periods, period I being from the starting day to the intermediate day, period II being from the intermediate day to the final day and period III being from the starting day to the final day. It was noted that in period II the average daily gain of the control pigs in pen 1 was 1.77 pounds and the feed efficiency was 4.22 pounds of feed per ton of gain. In pen 2 the average daily gain in period II was 1.87 pounds and the feed efficiency was 4.69 pounds of feed per pound of gain. In pen 3 the average daily gain in period II was 1.86 pounds and the feed efficiency was 3.42 pounds of feed per pound of gain. In pen 4 the average daily gain in period II was 1.87 pounds and the feed efficiency was 3.36 pounds per pound of gain. In pen 5 the average daily gain in period II was 1.78 pounds and the feed efficiency was 3.42 pounds per pound of gain. Thus, it was demonstrated that in the intermediate period the basic feed plus 8 pounds per ton of the sodium diacetate-whey composition of Table I produced maximum feed efficiency which was better than the control and even better than the feed efficiency of the basic feed plus the antibiotic. In the same period the basic feed plus 4 pounds per ton of the sodium diacetate-whey composition of Table I also gave a feed efficiency much better than the control and equal to that of the basic feed plus the antibiotic. During Period II the basic feed plus 2 pounds per ton of the sodium diacetate whey composition of Table I did not give as good efficiency as the control.

The over-all results are given in the following table:

TABLE II

| Pen No. | Average Total Gain per Pig in Pounds | Average Daily Gain per Pig in Pounds | Feed Efficiency Pounds of Feed Per Pounds of Gain |
|---|---|---|---|
| 1 | 170.6 | 1.45 | 3.61 |
| 2 | 173.1 | 1.47 | 3.50 |
| 3 | 170.1 | 1.44 | 3.32 |
| 4 | 167.9 | 1.42 | 3.54 |
| 5 | 185.6 | 1.57 | 3.21 |

From the results given in Table II it is apparent that the feed efficiency of the mixed feeds containing the sodium diacetate-whey composition of Table I was significantly better than the feed efficiency of the control with the optimum feed efficiency corresponding to 4 pounds per ton of the sodium diacetate-whey composition of Table I. This was somewhat higher than the feed efficiency obtained with the basic feed plus the antibiotic. The latter was fed to pen 5 up to the last two tons of feed at which time 50 grams of chlortetracycline had been added to the feed.

Up to the time that 4 tons of feed was consumed per pen pen 2 had a better feed conversion than did pen 1 (the control). This corresponded to 3.15 pounds of feed per pound of gain in pen 2 as compared to 3.38 pounds of feed per pound of gain in pen 1. In comparing pens 2 and 5 it was noted that pen 2 had a similar feed conversion but poorer average daily gains.

These results indicate that the amount of the sodium diacetate-whey composition added to the feed might be varied as the pigs change in size.

A number of the pigs in each pen were sent to market in the usual manner and processed in the conventional manner. They were also graded as premium, regular, and intermediate between premium and regular. Eleven pigs in pen 1 were marketed and none received a premium grade. Six were graded regular and five intermediate. Fourteen pigs in pen 2 were marketed, two received premium grade, seven were regular and five intermediate. Ten pigs in pen 3 were marketed. Five received a premium grade, one regular and four intermediate. Fourteen pigs in pen 4 were marketed. One received a premium grade, six were regular and seven intermediate. Seventeen pigs in pen 5 were marketed. Four received a premium grade, ten regular and three intermediate. Thus, the pigs in pen 3 were of the highest quality.

The amount of sodium diacetate in the total feed is preferably within the range of 0.025 to 0.25% and the quantity of dehydrated whey is preferably at least 4% by weight of the total sodium diacetate and whey. Especially good results have been obtained where the quantity of sodium diacetate is approximately 0.05–0.1% by weight of the pig feed.

In the foregoing description it will be understood that the composition of additive described in Table I can be varied within the ranges previously mentioned. Thus, the amount of spray dried whey can be reduced from 35.3% to about 3% by weight, in which case the amount of bentonite would be correspondingly increased from 5% by weight to 36.7%.

The expression "mixed pig feed" as referred to herein means a feed used in feeding pigs which is primarily a mixture of cereal grain containing starchy polysaccharides and a proteinaceous meal mixed with minor amounts of fat, sodium chloride, sugars, and mineral supplements. The cereal grain starchy polysaccharide is preferably corn and will usually comprise 25%–80% by weight of the total feed. Other cereal grain polysaccharides which can be substituted for the corn are wheat, rice, oats, barley, rye, milo, red millet, white millet and yellow millet, preferably wheat, oats, barley and milo. The specific amounts of cereal grain starchy polysaccharides other than corn will vary with the particular type of grain, for example, barley 0–80% by weight, wheat 0–80% by weight, oats 0–25% by weight.

The proteinaceous meal component of the mixed pig feed preferably comprises soybean meal, for example, up to 30%, preferably 10%–30% by weight of soybean meal containing 44% protein. Other proteinaceous components can be meat and bone meal from 0–20% by weight of the total feed, and tankage from 0–20% by weight of the total feed. Mineral components which can be employed are, for example, 0–1% by weight defluorinated phosphate, 0–0.15% by weight ferrous sulfate, 0.10–0.25% by weight sodium chloride, 0.05–0.10% by weight trace minerals, 0–1% by weight feeding lime, 0–5% by weight fat, 0–1% by weight molasses, and 0–0.1% by weight zinc oxide.

A preferred method of preparing the mixed feed is to mix the proteinaceous components and all other components except the cereal grain starchy polysaccharides together and then mix the resultant composition with a ground cereal grain, preferably corn. This type of procedure is the one previously described in which the proteinaceous component containing supplement is Ham Maker which contains at least 40% protein.

It will be understood that the invention is susceptible to other variations and modifications in the manner of its practical application.

In the specification and claims, the terms "feed efficiency" and "feed conversion" refer to pounds of feed required to produce one pound of live weight gain.

The invention is hereby claimed as follows:

1. A process of improving feed efficiency in the raising of pigs which consists essentially in feeding pigs with a mixed pig feed and from 0.1% to 0.4% by weight of sodium diacetate and dehydrated whey wherein the weight ratio of sodium diacetate to dehydrated whey is within the range of 25:1 to 1:4 whereby to enhance the feed efficiency of the feed.

2. A process as claimed in claim 1 wherein said sodium diacetate and said dehydrated whey are added to said mixed pig feed as a mixture in which the quantity of sodium diacetate is 20% to 75% by weight and the quantity of dehydrated whey is at least 3% by weight, the remainder being edible inert substances that have no substantial effect on the feed efficiency of the pig feed.

3. A process as claimed in claim 2 wherein the quantity of sodium diacetate is approximately 50% by weight of said mixture and the quantity of dehydrated whey is at least 3% by weight of said mixture.

4. A feed consisting essentially of a mixed pig feed to which has been added from 0.1% to 0.4% by weight of sodium diacetate and dehydrated whey wherein the weight ratio of sodium diacetate to dehydrated whey is within the range of 25:1 to 1:4 whereby to enhance the feed efficiency of said feed.

5. A feed as claimed in claim 4 wherein said mixed pig feed comprises a mixture of at least 25% by weight ground corn and proteinaceous meal in amounts from 10% to 30% by weight.

* * * * *